United States Patent
Berntsen et al.

(10) Patent No.: US 10,854,898 B2
(45) Date of Patent: Dec. 1, 2020

(54) DIRECT CURRENT (DC) LOAD LEVELERS

(71) Applicant: FuelCell Energy, Inc., Danbury, CT (US)

(72) Inventors: George P. Berntsen, Shelton, CT (US); Lincoln Vitalis, Woodbury, CT (US)

(73) Assignee: FuelCell Energy, Inc., Danbury, CT (US)

(*) Notice: Subject to any disclaimer, the term of this patent is extended or adjusted under 35 U.S.C. 154(b) by 225 days.

(21) Appl. No.: 16/116,582

(22) Filed: Aug. 29, 2018

(65) Prior Publication Data
US 2018/0375133 A1    Dec. 27, 2018

Related U.S. Application Data

(63) Continuation of application No. PCT/US2017/020254, filed on Mar. 1, 2017.

(Continued)

(51) Int. Cl.
*H01M 8/04537*     (2016.01)
*H02J 1/14*     (2006.01)
(Continued)

(52) U.S. Cl.
CPC .......... *H01M 8/04589* (2013.01); *H02J 1/14* (2013.01); *H02J 3/28* (2013.01); *H02J 3/32* (2013.01);
(Continued)

(58) Field of Classification Search
CPC ...... H02J 7/34; H02J 3/38; H02J 3/381; H02J 1/14; H02J 3/28; H02J 2300/30; H01M 2008/147; H01M 8/04589; Y02E 60/526
See application file for complete search history.

(56) References Cited

U.S. PATENT DOCUMENTS

| 4,039,823 | A | | 8/1977 | Jovanovic et al. | |
|---|---|---|---|---|---|
| 4,039,923 | A | * | 8/1977 | Vukasovic | H02M 7/523 363/79 |

(Continued)

FOREIGN PATENT DOCUMENTS

| JP | 2002-168572 A | 6/2002 |
|---|---|---|
| JP | 2003-229154 A | 8/2003 |

(Continued)

OTHER PUBLICATIONS

Office Action in JP 2018-545977 dated Sep. 20, 2019, English translation (17 pages).

(Continued)

*Primary Examiner* — Jared Fureman
*Assistant Examiner* — Duc M Pham
(74) *Attorney, Agent, or Firm* — Foley & Lardner LLP

(57) ABSTRACT

A load leveling system includes a fuel cell inverter, a direct current (DC) load bank, and a controller. The fuel cell inverter is configured to receive DC power generated by a fuel cell assembly. The DC load bank is connected to the fuel cell assembly in parallel with the fuel cell inverter. The controller is in communication with the fuel cell inverter and the DC load bank. The controller is configured to identify a reduction in a load being drawn by the fuel cell inverter. Responsive to the identification of the reduction of the load, the controller is also configured to divert the DC power generated by the fuel cell assembly from the fuel cell inverter to the DC load bank to prevent load cycling of the fuel cell assembly.

21 Claims, 2 Drawing Sheets

Related U.S. Application Data

(60) Provisional application No. 62/302,265, filed on Mar. 2, 2016.

(51) Int. Cl.
    *H02J 3/38* (2006.01)
    *H02J 7/34* (2006.01)
    *H02J 3/28* (2006.01)
    *H02J 3/32* (2006.01)
    *H01M 8/14* (2006.01)

(52) U.S. Cl.
    CPC ............... *H02J 3/38* (2013.01); *H02J 3/387* (2013.01); *H02J 7/34* (2013.01); *H01M 2008/147* (2013.01); *Y02E 60/50* (2013.01)

(56) References Cited

U.S. PATENT DOCUMENTS

2006/0046107 A1* 3/2006 Lindsey ............ H01M 8/04604
                                                                    700/295
2013/0041516 A1* 2/2013 Rockenfeller .......... H02J 3/387
                                                                    700/287
2016/0013646 A1* 1/2016 Akerson .................. H02J 3/14
                                                                    307/39

FOREIGN PATENT DOCUMENTS

| | | |
|---|---|---|
| JP | 2011-100597 A | 5/2011 |
| JP | 2014-239558 A | 12/2014 |
| JP | 2015-186408 A | 10/2015 |
| WO | WO-2013/094085 | 6/2013 |

OTHER PUBLICATIONS

International Search Report and Written Opinion for PCT/US2018/020254 dated May 15, 2017 (7 pages).

* cited by examiner

DIRECT CURRENT (DC) LOAD LEVELERS

CROSS-REFERENCE TO RELATED APPLICATIONS

The present application is a continuation of PCT/US2017/020254 filed on Mar. 1, 2017, which claims priority to U.S. Provisional Patent Application No. 62/302,265 filed on Mar. 2, 2016, the entireties of each of which are incorporated by reference herein.

BACKGROUND

A fuel cell is a device which converts chemical energy, such as energy stored in a hydrocarbon fuel, into electrical energy by way of an electrochemical reaction. Generally, a fuel cell includes an anode electrode and a cathode electrode separated by an electrolyte that serves to conduct electrically charged ions. High temperature fuel cells, such as molten carbonate fuel cells and solid oxide fuel cells, operate by passing a reactant fuel gas through the anode electrode, while oxidant gas (e.g., carbon dioxide and oxygen) is passed through the cathode electrode. In order to produce a desired power level, a number of individual fuel cells can be stacked in series. In operation, a fuel cell system can provide electrical power to a load, such as an electrical grid. If such a load is unexpectedly removed from the fuel cell system (e.g., the electric grid goes down), such removal can result in degradation of the fuel cell system in the form of thermal-mechanical stresses.

SUMMARY

A load leveling system includes a fuel cell inverter, a direct current (DC) load bank, and a controller. The fuel cell inverter is configured to draw DC power generated by a fuel cell assembly. The DC load bank is connected to the fuel cell assembly in parallel with the fuel cell inverter. The controller is in communication with the fuel cell inverter and the DC load bank. The controller is configured to identify a reduction in a load being drawn by the fuel cell inverter. Responsive to the identification of the reduction of the load, the controller is also configured to divert the DC power generated by the fuel cell assembly from the fuel cell inverter to the DC load bank to prevent load cycling of the fuel cell assembly.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the devices and/or processes described herein, as defined by the claims, will become apparent in the detailed description set forth herein and taken in conjunction with the accompanying drawings.

DETAILED DESCRIPTION

The lifetime of a high temperature fuel cell system (e.g., a molten carbonate fuel cell system or a solid oxide fuel cell system) is adversely impacted by load cycling, which can be caused by a sudden reduction (or complete disappearance) of a load that is drawing power from the fuel cell system. Specifically, components of the fuel cell system experience increased thermal-mechanical stresses during such load cycling situations. Unplanned load cycling can occur due to unstable electric grid (i.e., load) conditions, which cause inadvertent tripping of the inverter(s) connected to the fuel cell system.

One way to help reduce the impact of load cycling due to a tripped inverter is to quickly reset the inverter such that most or all of the thermal-mechanical stresses on the fuel cell system are eliminated. Another way to help reduce the impact of load cycling in this situation is to improve inverter reliability and grid disturbance ride through capability of the overall system. However, such solutions are ineffective when the fuel cell inverter is down for a sustained period of time due to malfunction, a prolonged electric grid disturbance, etc. Described herein is a system that is designed to prevent load cycling (and the resultant stresses on the system) in the event that the fuel cell inverter(s) are tripped off and cannot be immediately reset due to unstable grid conditions, malfunction, other load failure, etc.

Figure 1:
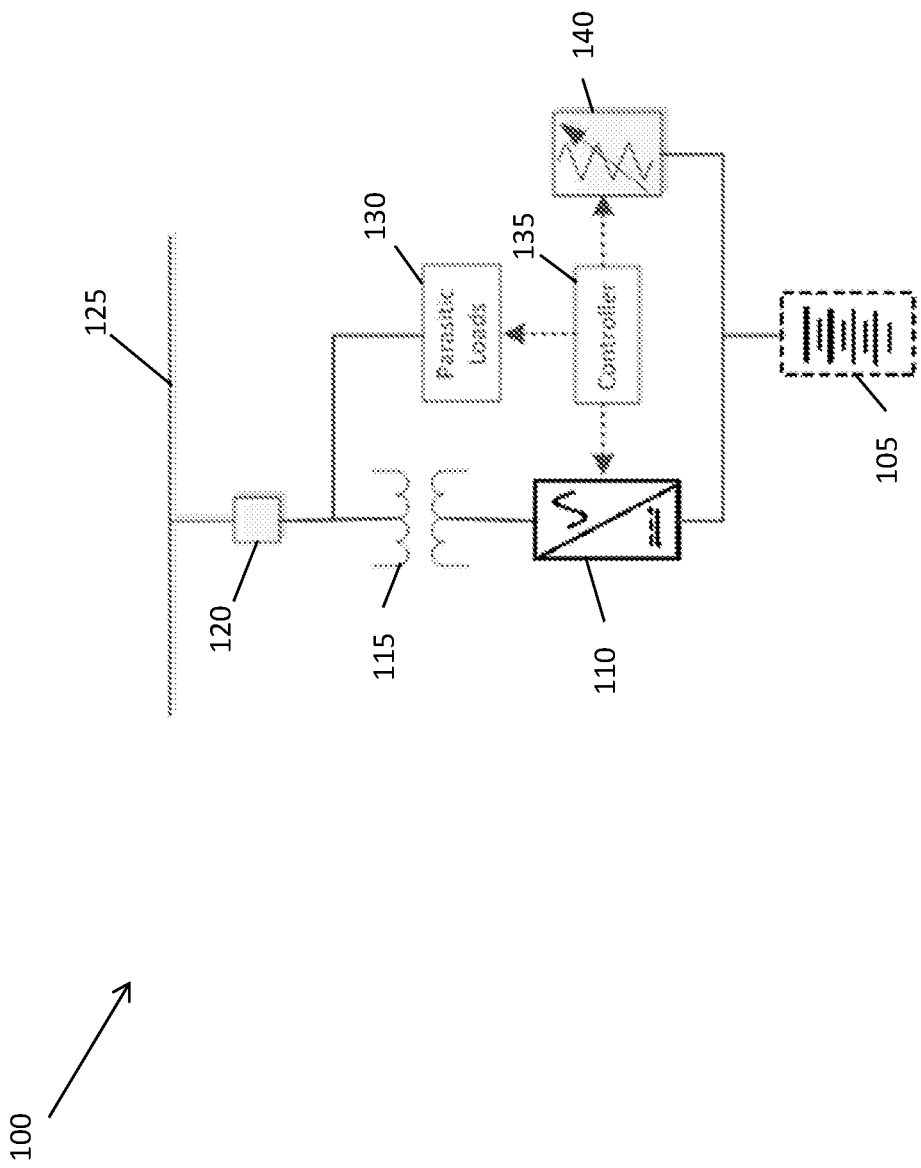
FIG. 1 is a block diagram of a fuel cell load leveling system in accordance with an illustrative embodiment.

FIG. 1 is a block diagram of a fuel cell load leveling system 100 in accordance with an illustrative embodiment. The system 100, which is connected to an electric grid 125, includes a fuel cell assembly 105, a fuel cell inverter 110, an output transformer 115, and an output breaker 120. The system 100 also includes parasitic loads 130, a controller 135, and a direct current (DC) load bank 140. In alternative embodiments, fewer, additional, and/or different components may be included in the fuel cell load leveling system 100.

In an illustrative embodiment, the fuel cell assembly 105 is composed of one or more fuel cell columns, each of which may include one or more fuel cell stacks. In another illustrative embodiment, the fuel cells of fuel cell assembly 105 are molten carbonate fuel cells. In alternative embodiments, different types of fuel cells may be used. The fuel cell assembly 105 is used to generate direct current (DC) power that is received by the fuel cell inverter 110 via a bus line. The fuel cell inverter 110 can be a single inverter, or a plurality of inverters, depending on the implementation. Upon receipt of a DC demand signal generated by the controller 135, the fuel cell inverter 110 inverts the DC power into alternating current (AC) power, which is fed to the output transformer 115. The output transformer 115 steps the AC voltage received from the fuel cell inverter 110 up to a desired value that is compatible with the electric grid 125. In alternative embodiments, the output transformer 108 may step down the voltage received from the fuel cell inverter 110. The output breaker 120 can be used to disconnect the fuel cell load leveling system 100 from the electric grid 125 for maintenance, to operate the grid independently, etc.

As indicated in FIG. 1, the parasitic loads 130 are connected to an output of the output transformer 115 via a bus line. As such, the parasitic loads 130 are able to receive the same stepped up AC voltage which is provided to the electric grid 125. The parasitic loads 130 can include blowers, process heaters, water treatment units, heating, ventilating, and air conditioning (HVAC) systems, etc.

The DC load bank 140 is connected to an output of the fuel cell assembly 105 via the same bus line that connects the fuel cell assembly 105 to the fuel cell inverter 110 (i.e., the DC load bank 140 is connected to the fuel cell assembly 105 in parallel with the connection of the fuel cell assembly 105 to the fuel cell inverter 110). In an alternative embodiment, different bus lines may be used to connect the fuel cell assembly 105 to the DC load bank 140 and to the fuel cell inverter 110. As its name implies, the DC load bank 140 includes one or more direct current loads. These direct current loads are able to draw the DC power directly from fuel cell assembly 105 in the event that fuel cell inverter 110 is tripped off or malfunctions. As a result, load cycling and the associated thermal-mechanical stresses on the fuel cell assembly 105 are avoided.

The DC load bank 140 can include any DC load(s) known to those of skill in the art. For example, the DC load bank 140 can include actual loads that utilize the DC power generated by the fuel cell assembly 105 such as Variable Frequency motor drives, DC lighting, hydrogen electrolyzers, data center servers, etc. Alternatively, the DC load bank 140 can be configured to dissipate the DC power generated by the fuel cell assembly 105 such that the fuel cell assembly 105 is able to continue to operate until the fuel cell inverter 110 is once again operational and able to receive the DC power. In one implementation in which there is an available heat load, the DC load bank 140 may be a variable electric heater that is configured to recover the energy dissipated from the fuel cell assembly 105.

In another embodiment, if there are critical loads in a backup application, the DC load bank 140 can also be used to maintain the fuel cell stacks at constant power while load following when power from the electric grid 125 is unavailable. Additionally, for multiple fuel cell systems with multiple inverters, a DC load bank can be implemented for each inverter to maintain the same capability of individualized stack current control. Alternatively, fuel cell systems having multiple inverters may utilize a common load bank that can be used for all of the fuel cell stacks if individualized stack current control is not required. Such a common load bank system is more cost effective than having an individual DC load bank associated with each stack of the fuel cell assembly.

The controller 135 can be a computerized controller that includes at least a processor, a memory, a transceiver, and an interface. In one embodiment, the memory of the controller 135 can include computer-readable instructions stored thereon. The computer-readable instructions can be executed by the processor to perform any of the operations described herein. The controller will receive a signal representative of the fuel cell stack output current from a sensor which will be compared to a desired current setpoint. The difference will be input to a proportional+integral (PI) control algorithm which will calculate a current demand signal which the controller will send to the DC load bank. The PI control algorithm will thus adjust the DC load as necessary to maintain the fuel cell stack current output at the desired setpoint. The transceiver allows the controller to communicate with other system components such as the parasitic loads 130, the fuel cell inverter 110, and the DC load bank 140. The interface allows to user to interact with the controller 135 to enter commands, program the unit, view status and other information, etc.

As depicted in FIG. 1, the controller 135 is in communication with the fuel cell inverter 110, the parasitic loads 130, and the DC load bank 140. The controller 135 is configured to monitor and control the fuel cell inverter 110. In the event that the inverter 110 is tripped off for any reason, the controller 135 ensures that the DC power from the fuel cell assembly 105 is instead received by the DC load bank 140. In an illustrative embodiment, the controller 135 can also control the DC load bank 140 such that the amount of load present is equivalent (or substantially equivalent) to the amount of load that is no longer being drawn by the fuel cell inverter 110. The controller 135 is also configured to monitor and control the parasitic loads 130. In one embodiment, in the event of an inverter trip, a small inverter can be used to receive all or a portion of the DC power from the fuel cell assembly 105, invert the DC power to AC power, and provide the AC power to the parasitic loads 130. As a result, the parasitic loads 130 can continue to receive power in the event that the fuel cell inverter 110 is tripped off.

Figure 2:
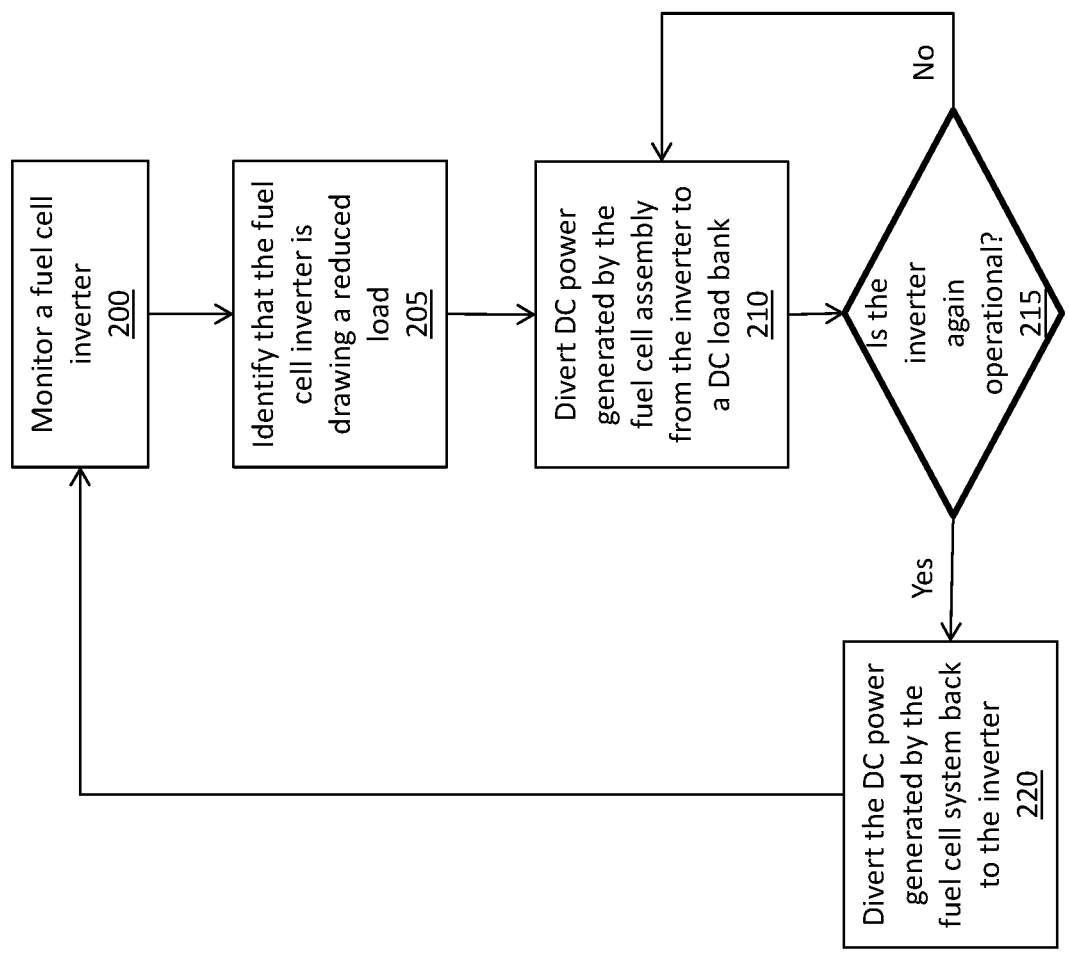
FIG. 2 is a flow diagram depicting operations for load leveling in a fuel cell system in accordance with an illustrative embodiment.

FIG. 2 is a flow diagram depicting operations for load leveling in a fuel cell system in accordance with an illustrative embodiment. In alternative embodiments, fewer, additional, and/or different operations may be performed. Additionally, the use of a flow diagram is not meant to be limiting with respect to the order of operations performed. In an operation 200, a fuel cell inverter is monitored. The fuel cell inverter can be the fuel cell inverter 110 discussed with reference to FIG. 1, or any other fuel cell inverter or inverters, depending on the implementation. The monitoring, which is used to detect a partial or complete reduction in the load drawn by the inverter, can be performed by a controller such as the controller 135.

In an operation 205, the system identifies that the fuel cell inverter is drawing a reduced load. The identification may be made by a controller. The reduced load can be a partially reduced load or a zero load condition that results from electric grid disturbances, inverter malfunction, etc. In an operation 210, the system diverts DC power generated by the fuel cell assembly from the fuel cell inverter to the DC load bank. Such diverting of the DC power is responsive to the identification of the reduced load being drawn by the inverter and is used to prevent load cycling of the fuel cell assembly. In an illustrative embodiment, the DC load bank can be connected to the fuel cell assembly in parallel with the fuel cell inverter. In at least some embodiments, the diverting may be performed at least in part by a controller such as the controller 135.

In an operation 215, a decision is made regarding whether the inverter is again operational. The decision, which can be made by the controller, can be based on the continued monitoring of the fuel cell inverter after diversion of DC power to the DC load bank. If it is determined in the operation 215 that the inverter is still not operational, DC power generated by the fuel cell assembly continues to be diverted to the fuel cell bank. If it is determined in the operation 215 that the inverter is once again operational, the DC power generated by the fuel cell assembly is diverted back to the inverter in an operation 220 such that normal operation can commence. Such diversion of the DC power back to the fuel cell inverter can also be performed by the controller. The system then continues to monitor the fuel cell inverter in the operation 200.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:
1. A load leveling system comprising:
 a fuel cell inverter configured to receive direct current (DC) power generated by a fuel cell assembly;
 a DC load bank connected to the fuel cell assembly in parallel with the fuel cell inverter; and a controller in communication with the fuel cell inverter and the DC load bank, wherein the controller is configured to:
  identify a reduction in a load being drawn by the fuel cell inverter;
  responsive to the identification of the reduction of the load, divert the DC power generated by the fuel cell assembly from the fuel cell inverter to the DC load bank to prevent load cycling of the fuel cell assembly;
  monitor a condition of the fuel cell inverter after diverting the DC power from the fuel cell inverter to the DC load bank;
  determine that the fuel cell inverter is again operational; and
  based on the determination that the fuel cell inverter is again operational, divert the DC power from the DC load bank back to the fuel cell inverter.

2. The load leveling system of claim 1, wherein the fuel cell assembly comprises a molten carbonate fuel cell assembly.

3. The load leveling system of claim 1, wherein the fuel cell assembly comprises one or more fuel cell stacks.

4. The load leveling system of claim 1, wherein the fuel cell inverter comprises a plurality of inverters, and wherein the DC load bank is a single DC load bank to which DC power is diverted from the plurality of inverters.

5. The load leveling system of claim 1, further comprising an output transformer configured to step up a received voltage, wherein the fuel cell inverter is configured to invert the DC power generated by the fuel cell assembly into alternating current (AC) power and feed the AC power to the output transformer.

6. The load leveling system of claim 5, further comprising an output breaker connected to the output transformer, wherein the output breaker is configured to selectively disconnect the load leveling system from an electrical grid.

7. The load leveling system of claim 5, further comprising one or more parasitic loads connected to an output of the output transformer, wherein the controller is configured to monitor and control the parasitic loads such that, responsive to the identification of the reduction of the load, at least a portion of power generated by the fuel cell assembly is diverted from the fuel cell inverter to the one or more parasitic loads.

8. The load leveling system of claim 1, wherein the DC load bank comprises one or more DC loads, and wherein the one or more DC loads comprise one or more of a variable frequency motor drive, DC lighting, a hydrogen electrolyzer, a data center server, or a variable electric heater.

9. The load leveling system of claim 1, wherein the controller comprises a processor, a memory, a transceiver, and an interface, and wherein the controller is further configured to:
  receive, from a sensor, a signal representative of an output current of the fuel cell assembly;
  compare the signal representative of the output current to a desired current setpoint; and
  adjust a load of the DC load bank based on a difference between the signal representative of the output current and the desired current setpoint.

10. The load leveling system of claim 1, wherein the controller is further configured to monitor the condition of the fuel cell inverter prior to diverting the DC power from the fuel cell inverter to the DC load bank.

11. The load leveling system of claim 10, wherein the controller is further configured to divert the DC power generated by the fuel cell assembly from the fuel cell inverter to the DC load bank in response to a determination by the controller that the fuel cell inverter is tripped off.

12. A method for leveling a load of a fuel cell system, the method comprising:
  identifying a reduction in a load being drawn by a fuel cell inverter from a fuel cell assembly; and
  responsive to the identification of the reduction of the load, diverting direct current (DC) power generated by the fuel cell assembly from the fuel cell inverter to a DC load bank to prevent load cycling of the fuel cell assembly;
  monitoring a condition of the fuel cell inverter after diverting the DC power from the fuel cell inverter to the DC load bank;
  determining that the fuel cell inverter is again operational; and
  based on the determination that the fuel cell inverter is again operational, diverting the DC power from the DC load bank back to the fuel cell inverter.

13. The method of claim 12, wherein the DC load bank is connected to the fuel cell assembly in parallel with the fuel cell inverter.

14. The method of claim 12, wherein the reduced load comprises a partially reduced load.

15. The method of claim 12, wherein the reduced load comprises a zero load condition.

16. The method of claim 12, wherein diverting the DC power comprises:
  receiving a signal representative of an output current of the fuel cell assembly from a sensor;
  comparing the signal representative of the output current to a desired current setpoint; and
  adjusting a load of the DC load bank based on a difference between the signal representative of the output current and the desired current setpoint.

17. The method of claim 12, further comprising, responsive to the identification of the reduction of the load, diverting at least a portion of power generated by the fuel cell assembly from the fuel cell inverter to one or more parasitic loads, wherein the one or more parasitic loads are separate from the DC load bank.

18. The method of claim 12, wherein the DC load bank comprises one or more DC loads, and wherein the one or more DC loads comprise one or more of a variable frequency motor drive, DC lighting, a hydrogen electrolyzer, a data center server, or a variable electric heater.

19. The method of claim 12, wherein the fuel cell inverter comprises a plurality of inverters, and wherein diverting the DC power comprises diverting the DC power from the plurality of inverters to the DC load bank.

20. The method of claim 12, further comprising:
  monitoring a condition of the fuel cell inverter after diverting the DC power from the fuel cell inverter to the DC load bank;
  determining that the fuel cell inverter is again operational;
  diverting the DC power from the DC load bank back to the fuel cell inverter; and
  returning the fuel cell inverter to normal operation, wherein during normal operation the fuel cell inverter inverts the DC power generated by the fuel cell assembly into alternating current (AC) power and feeds the AC power to an output transformer for transmission of the AC power on an electrical grid.

21. The method of claim 12, wherein monitoring the condition of the fuel cell inverter comprises determining an operational status of the fuel cell inverter.

* * * * *